United States Patent [19]
Sapiro et al.

[11] Patent Number: 6,021,227
[45] Date of Patent: Feb. 1, 2000

[54] IMAGE COMPRESSION SYSTEM INCLUDING ENCODER HAVING RUN MODE

[75] Inventors: Guillermo Sapiro, Los Altos; Gadiel Seroussi, Cupertino; Marcelo Weinberger, San Jose, all of Calif.

[73] Assignee: Hewlett-Packard Company, Palo Alto, Calif.

[21] Appl. No.: 08/885,083

[22] Filed: Jun. 30, 1997

[51] Int. Cl.[7] .................................................. H04N 1/417
[52] U.S. Cl. ........................... 382/239; 382/232; 358/426
[58] Field of Search .................................... 382/232, 239, 382/243–246, 248, 251–252; 358/426, 428, 430

[56] References Cited

U.S. PATENT DOCUMENTS 5,748,786  5/1998  Zandi et al. .............................. 382/240
5,764,374  6/1998  Seroussi et al. ......................... 358/427

OTHER PUBLICATIONS

M. J. Weinberger, G. Seroussi, and G. Sapiro, Hewlett–Packard Laboratories, Palo Alto, CA 94304; "A low complexity, context–based, lossless image compression algorithm", Data Compression Conference, Snowbird, Utah, Mar. 31—Apr. 3, 1996.

Dr. Daniel T. Lee, Hewlett–Packard Company, 1501 Page Mill Road, Palo Alto, CA 94304–1126, USA "CD 14495, Lossless and near–lossless coding of continuous tone still images (JPEG–LS)", ISO/IEC JTC1/SC29 WG1, Mar. 21, 1997.

*Primary Examiner*—Thomas D Lee
*Assistant Examiner*—Stephen Brinich

[57] ABSTRACT

An image compression system having a causal, context-based, single-pass adaptive filter encoder that encodes pixel values using multiple context-based threshold values. In the general case, the threshold value is a function of the context of a pixel being encoded. In one specific embodiment one threshold value is used in non-run mode contexts and another threshold value is used in run mode contexts. A single threshold decompressor may decode images encoded using the multi-threshold encoder of the invention. Other systems and methods are disclosed.

20 Claims, 6 Drawing Sheets

IMAGE COMPRESSION SYSTEM INCLUDING ENCODER HAVING RUN MODE

TECHNICAL FIELD OF THE INVENTION

The invention relates generally to image compression, and, more particularly, to low complexity near-lossless compression having having an embedded causal, context-based, single-pass adaptive filtering for use with pre-defined decoders.

BACKGROUND ART

The use of compression algorithms for efficient data storage and communication has become a key component in most digital imaging systems. In many applications a reduction in the amount of resources required to store or transmit data is crucial, so that compression can be viewed as an enabling technology. Image compression algorithms are broadly classified into lossy (irreversible) schemes, for which the original pixel intensities cannot be perfectly recovered from the encoded bit stream, lossless (reversible) schemes, for which the coding algorithms yield decompressed images identical to the original digitized images, and near- lossless schemes, where the error, pixel-by-pixel, between the original and reconstructed images is bounded by a pre-determined value.

One example of a lossless/near-lossless image compressor system is known as JPEG-LS. JPEG-LS is described in "JPEG-LS: Lossless/near-loss image compression, "Committee Draft 14495, ISO/IEC JTC 1/SC 29/WG 1, March 1997, the entire disclosure of which is incorporated herein by reference.

FIG. 1 is a block diagram of a lossless/near-lossless encoding system like JPEG-LS and is described in greater detail below. Other related compression systems are described in U.S. patent application Ser. No. 08/503,792 entitled "System and Method for Lossless Image Compression", filed Jul. 18, 1995 now U.S. Pat. No. 5,680,129 and U.S. patent application Ser. No. 08/706,010, entitled "System and Method for Lossless Image Compression Having Improved Sequential Determination of Golomb Parameter", filed Aug. 30, 1996, now U.S. Pat. No. 5,764,374 both of which are incorporated herein by reference.

An ever important goal in the image compression art is to reduce the number of bits required to encode an image. One technique used in JPEG-LS to achieve a high compression rate is to encode runs of consecutive pixels that are bound with respect to the last pixel before the run by a pre-defined value (near) using a code indicative of the length of the run.

In JPEG-LS the encoder uses previously encoded data to detect "flat zones," in which case the encoder enters run mode. In run mode, encoding is done on runs of consecutive samples of value equal to the last encoded sample (lossless) or of values that are within the maximal allowed error near of the last encoded sample (near-lossless mode).

In certain applications, small variations in "unimportant" information in an image can throw the encoder out of run mode. For example, in many photographic images, the background is of relatively low importance in terms of content and is often of nearly uniform color and light intensity. Similarly, in many scanned images due to artifacts from the scanning process, what would ideally be a solid area may contain certain pixels that have digitized values that are slightly off from their neighbors. Such variations make runs much shorter than what should be encoded as runs to achieve a better compression rate.

It is therefore desireable to have an encoder that improves run length encoding in "unimportant" areas without losing detail in "important" areas of images. "Important" and "unimportant" may be subjective terms, but generally solid regions, such as background, contain less important information than regions with large pixel-to-pixel variations in pixel values.

JPEG-LS is a standard that specifies a particular algorithm for decoding of images that have been encoded according to the standard. It would be desirable to achieve better run length encoding of images while allowing end-users to decode the images using a standard unmodified JPEG-LS decoder.

SUMMARY OF THE INVENTION

The present invention achieves an improvement in the encoding of images by providing a context dependent threshold value near. Generally, according to the invention there may be one value for near for each context. No modification to the decoder is necessary, as it assumes that the entire image was encoded using one unique value for near.

In one embodiment, the present invention achieves an improved run length encoding in near-lossless compression mode than the standard JPEG-LS encoder without requiring any modification to the standard JPEG-LS decoder. In that embodiment one value for near is used in regular modes and another value, runnear, is used in run mode. The decoder assumes that runnear is equal to near, which is the only information available to it.

One advantage of the present invention over the prior art is improved compression rates without a substantial deterioration in image quality of reconstructed images and without significant additional computation.

Still other advantages of the present invention will become readily apparent to those skilled in this art from the detailed description, wherein we have shown and described the preferred embodiments of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The invention is best understood by referring to the drawings accompanying this specification in which like numerals represent like elements. As a convention, elements bearing a reference numeral followed by a single or multiple apostrophes is an identical element or similar to, but a variation of, the element bearing the numeral without an apostrophe and any other elements with the same reference numeral but having a different number of apostrophes.

DETAILED DESCRIPTION OF THE DRAWINGS

Figure 1:
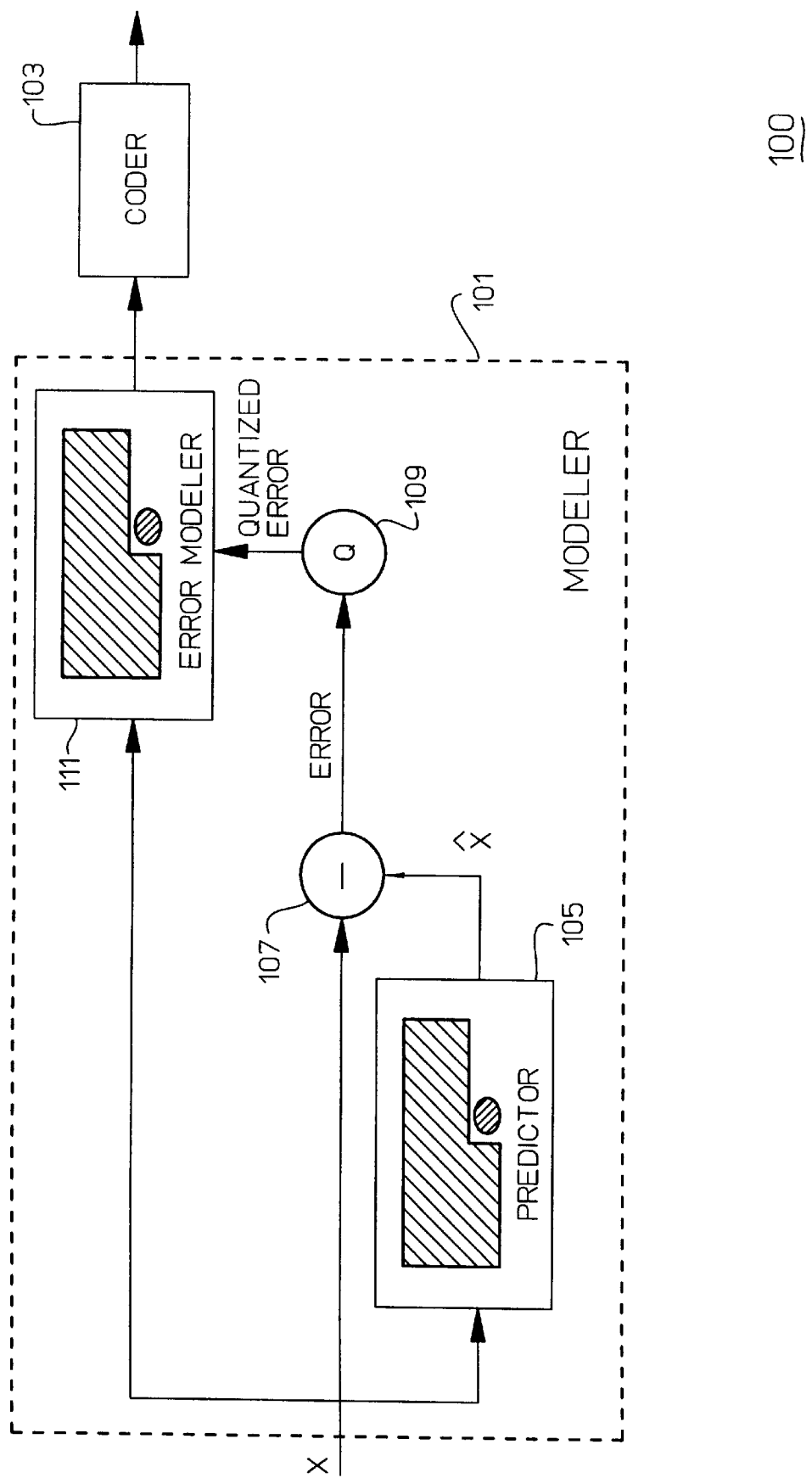
FIG. 1 is a block diagram of a typical lossless/near-lossless image compression scheme of the prior art.

FIG. 1 is a block diagram of a lossless and near-lossless encoding system 100. The encoding system 100 has two major components, a modeler 101 and a coder 103. Such a compression system is described in patent application Ser. Nos. 08/503,792 now U.S. Pat. No. 5,680,129 and 08/706,010, now U.S. Pat. No. 5,764,374 both of which are incorperated herein by reference.

The modeler 101 accepts, as input, pixels to be encoded, x. A predictor 105 receives the input pixel x and, using previously encoded pixels (described below in conjunction with FIG. 2), predicts a deterministic value, $\hat{x}$, for the current image sample x.

A comparator 107 determines the difference (or error, e) between the pixel value and the predicted value.

For near-lossless encoding, a quantizer 109 quantizes the prediction error, e, according to equation (1), so that the absolute value of the difference between the sample value reconstructed by the decoder and the original one is not larger than near, a pre-specified parameter.

$$\text{if } e \geq 0, q = \left\lfloor \frac{e + \text{near}}{2*\text{near} + 1} \right\rfloor \qquad (1)$$

$$\text{if } e < 0, q = -\left\lfloor \frac{\text{near} - e}{2*\text{near} + 1} \right\rfloor$$

The error (or quantized error) is input into an error modeler 111. Each pixel is also input into the error modeler 111. Using the context formed by previously encoded pixels, the error modeler 111 builds a statistical model for prediction errors.

The statistical model, combined with the error, are fed into the coder 103. Using the statistical model, the coder encodes the error. The statistical model is used so that more frequently occuring events (error values) are encoded using shorter code words. Examples of encoding techniques include Huffman coding (e.g., as in U.S. patent application Ser. No. 08/503,792 now U.S. Pat. No. 5,680,129), arithmetic coding (e.g., as in the Sunset coders, G. Langdon, Jr., "Sunset: A hardware-oriented algorithm for lossless compression of gray-scale images", Proceedings SPIE Medical Imaging V, Vol. 1444, pp. 272–282, May 1991), or Golomb coding (e.g., as in U.S. patent application Ser. No. 08/706,010 now U.S. Pat. No. 5,764,374).

The modeler 101 includes embedded run detection and encoding. The encoder 100 uses previously encoded data to detect "flat zones", i.e., areas where there is no (or in the case of near-lossless mode, bounded by near) variation between adjacent pixel values. When the encoder 100 detects a flat zone, the encoder 100 enters the run mode. In run mode, the encoder 100 encodes with a single number the number of consecutive samples of value equal to the last encoded sample (lossless mode), or of values that are within the maximal allowed error near of the last encoded sample (near-lossless mode). In the near-lossless case, the reconstructed value for all the samples in the run is equal to the reconstructed value of the last sample, in the same row, encoded before entering run mode. JPEG-LS provides special provisions for runs at the beginning of a row, because no previously encoded sample exists.

Figure 2:
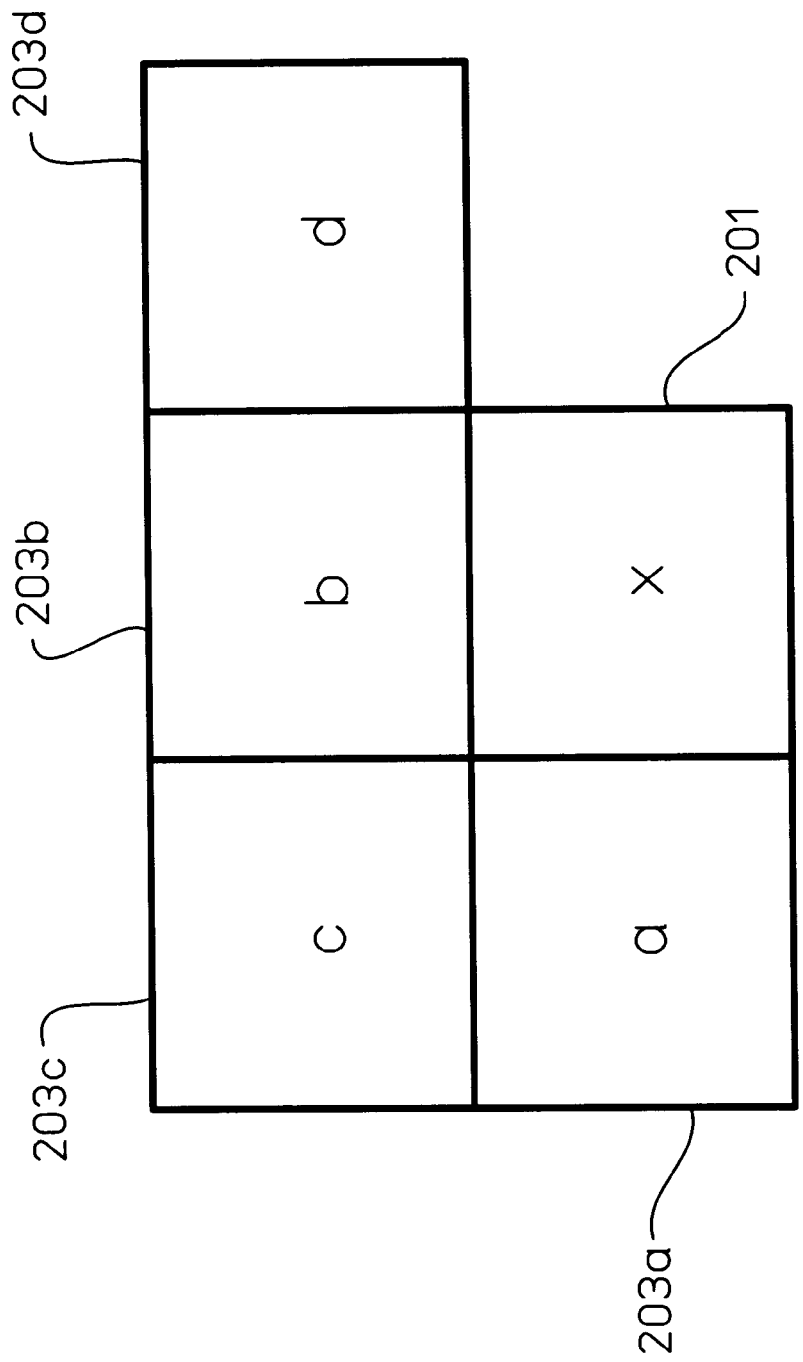
FIG. 2 is a causal template used by JPEG-LS encoders (as well as encoders according to the invention) to determine the context of a pixel to be encoded.

FIG. 2 is an illustration of a template 200 used for error modeling, including determining whether to enter into run mode. A pixel 201 contains a value x to be encoded. The previously encoded pixels 203a–d contain values a, b, c, and d, respectively.

The error modeler in JPEG-LS is based on the differences d–b, b–c, and c–a. In lossless mode, a, b, c, and d are the original image samples, while in the near-lossless case, a, b, c, and d are reconstructed by reversing the quantization step. x is always the value in the original image.

In JPEG-LS the three differences d–b, b–c, and c–a quantized to nine regions each, define the context for of the sample x. Patent application Ser. No. 08/503,792 now U.S. Pat. No. 5,680,129 provides a detailed discussion of the determination of the context of a sample x.

Entering Run Mode

When the differences d–b, b–c, and c–a are equal to zero (lossless mode), or when their respective absolute values are less than the maximal allowed error near (near-lossless mode), a run context is detected and the encoder 100 enters into run mode. In other words, JPEG-LS enters into run mode if:

$$|d-b| \text{ and } |b-c| \text{ and } |c-a| \leq \text{near} \qquad (2)$$

(Note: near=0 is a special case of near-lossless, namely it is completely lossless.)

In JPEG-LS, in run mode, the encoder 100 continues to accept image samples x so long as the input sample has the same value as the sample on its immediate left, a (lossless mode), or as long as the absolute difference between those values and a is less than or equal the maximal allowed error near (near-lossless mode). In near-lossless mode, a is a reconstructed value.

Figure 3:
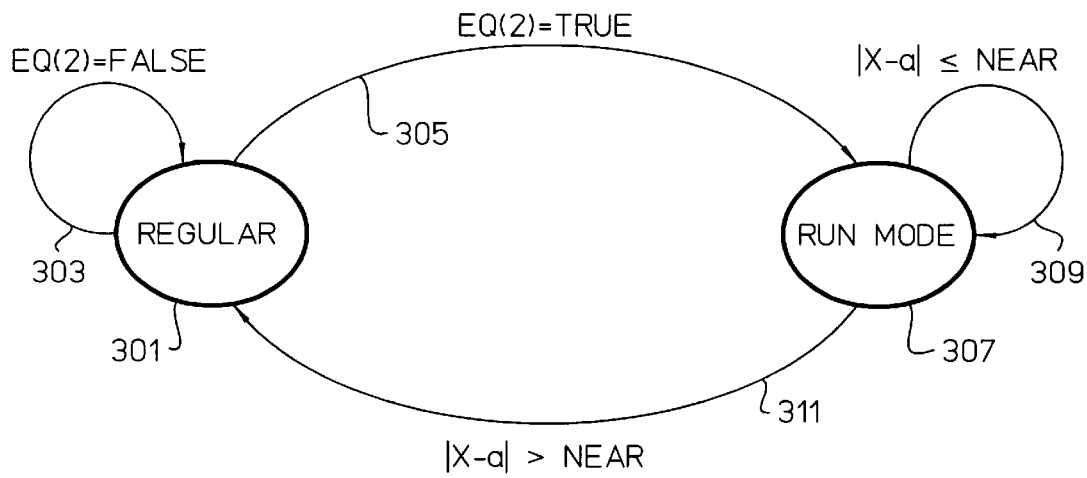
FIG. 3 is a transition state diagram illustrating the transitions between regular mode and run mode in prior art encoding systems.

FIG. 3 is a transition state diagram illustrating the transitions that a prior art encoder makes between regular mode and run mode. In a regular mode state 301 the encoder encodes a pixel using the encoders regular mode encoding scheme. As illustrated by a transition 303, if while in the regular mode state 301 the encoder encounters a pixel such that equation (2) is not satisfied, the encoder remains in the regular mode state 301.

If the encoder receives a pixel whose value x is such equation (2) is satisfied, then the encoder follows a transition 305 into run mode state 307.

If while in the run mode state 307, the encoder may either stay in run mode state, following transition 309, or return to regular mode state 301, following transition 311. The encoder stays in the run mode state if $|x-a| \leq \text{near}$, and returns to the regular mode state if $|x-a| > \text{near}$.

Entering and staying in run mode state according to the invention.

According to the invention, the value near is adapted as a function of the context of the pixel being encoded. That is the value of near is adapted as a function of the differences d–b, b–c, and c–a.

Figure 4:
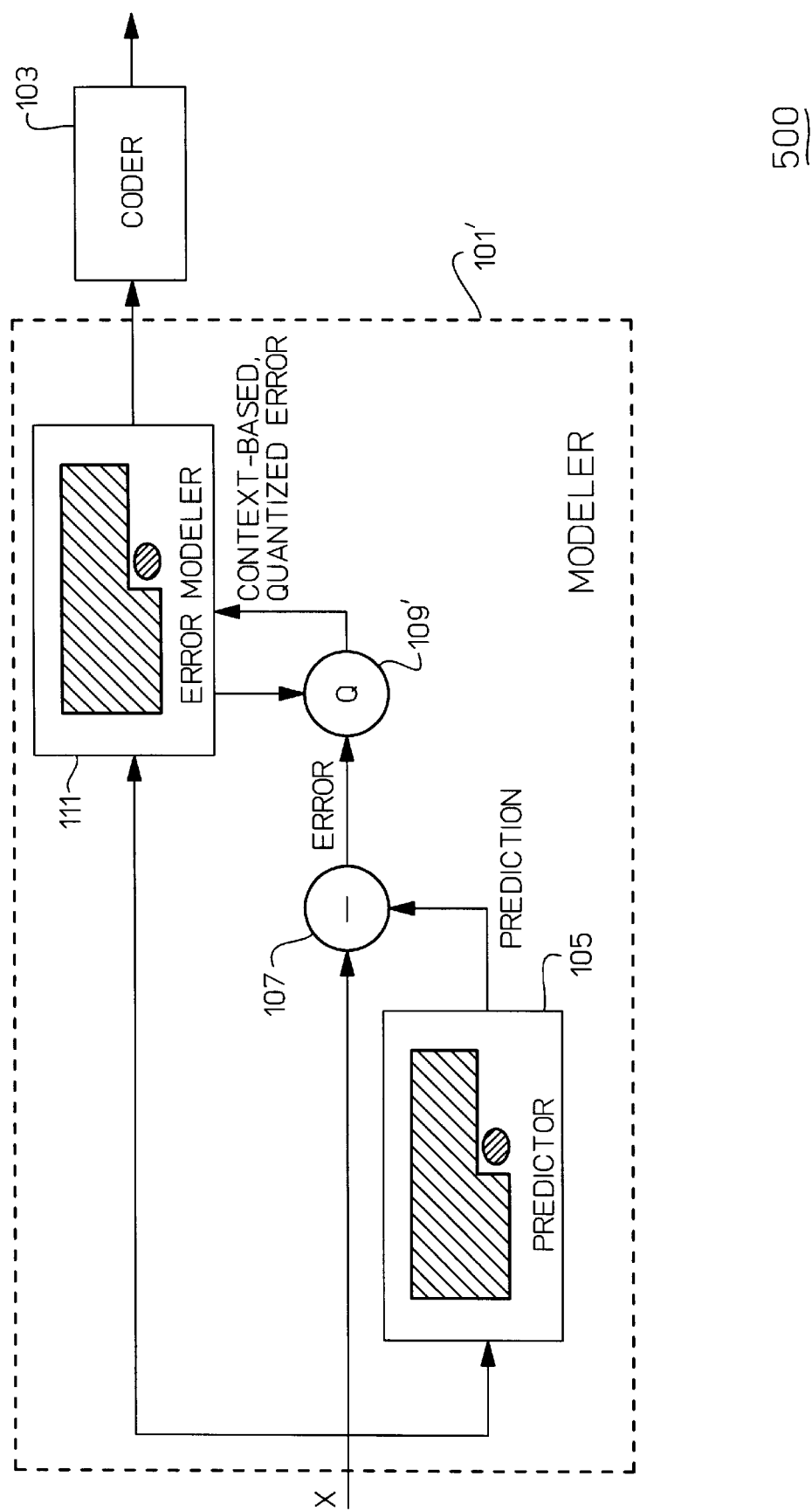
FIG. 4 is an encoding system according to a first embodiment of the invention.

FIG. 4 is an illustration of an encoder 500 that adaptively changes the value of near as a function of the context. As with encoder 100 of FIG. 1, the encoder contains a modeler 101', a coder 103, a predictor 105, a comparator 107, and an error modeler 111. The encoder also contains a quantizer 109'. The quantizer 109' serves the same function as the quantizer 109 of FIG. 1, with the one distinction that the quantizer 109' receives as an input the context of the pixel to be encoded. The quantizer 109' uses the context to adjust the value of near.

An advantage of the present invention is that the encoder 500 adapts the value of near so as to achieve both improved compression rates and so that a standard JPEG-LS decoder (or similar decoder) may decode an image compressed using the encoder 500 without any knowledge that the encoder 500 (as opposed to a standard JPEG-LS encoder 100) was used to encode the image. While the encoder 500 may use as many values of near as there are contexts, the decoder only uses one value for near. The only restriction on the values of near used by the encoder is that any encoding of a pixel satisfies the requirement of JPEG-LS that $$|x-y| \leq near \quad (3)$$

where y is the reconstructed value for x.

In one embodiment of the invention, the encoder uses a distinct value for near when in regular mode (for the purposes of equation (1) and to trigger entering into run mode, equation (2)) and another value in run mode (to determine whether to stay in run mode or to return to regular mode).

In that embodiment, the encoder 100 maintains two distinct threshold variables, near and runnear. near is used in regular mode, to determine whether to enter into run mode, and runnear is used to decide whether to remain in run mode.

Figure 5:
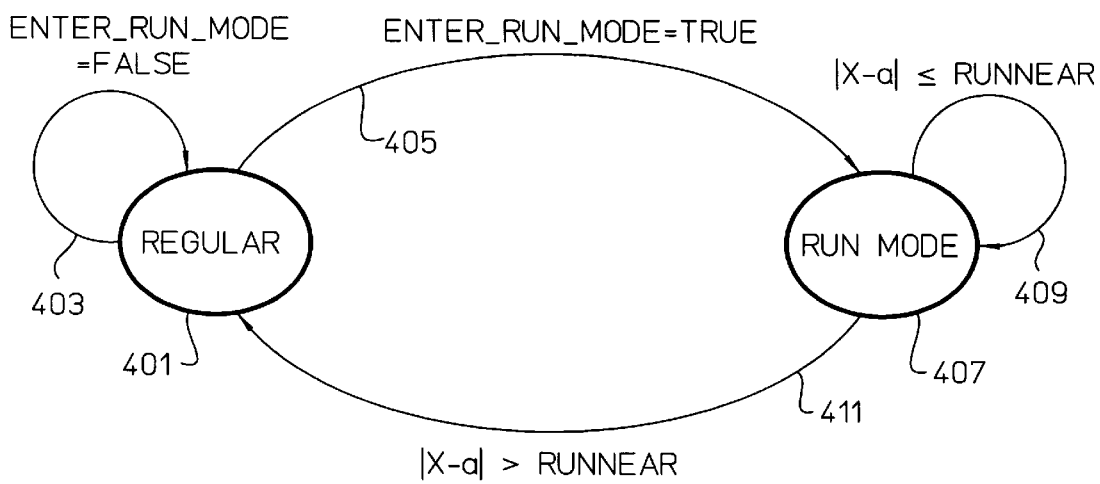
FIG. 5 is a transition state diagram illustrating the transitions between regular mode and run mode in encoders according to the invention.

FIG. 5 is a state transition diagram illustrating the transition between regular mode and run mode according to the invention. Similarly to the prior art transition diagram shown in FIG. 3, the encoder remains in regular mode 401 so long as the condition to enter into run mode remains false, transition 403. The Enter\_Run\_Mode condition of FIG. 4 may be equation (2) or another context dependent condition.

When in run mode state 407, the encoder remains in run mode, transition 409, if $$|x-a| \leq runnear \quad (4)$$

and, exits run mode state 407 and returns to regular encoding mode 401, transition 411, if $$|x-a| > runnear \quad (5)$$

---

Consider the sequence of pixel values
    index, i                             1 2 3 4 5 6 7 8 9 10
    previous row                 2 3 5 5 5 4 4 4 4 4
    row to encode, $x_i$         4 3 5 5 5 5 6 4 5 9
    near = 0, runnear = 2
      Example 1.

---

For the prior art encoder (near=runnear=0), the run of 5's from pixel 4 through 6, is encoded as a run of 3 pixels (the context of pixel 4 is a=b=c=d=5, thus, triggering entry into run mode). In the present invention, the seventh pixel value 6 and the eighth pixel value 4 are included in the run because neither deviates from the previously encoded sample (pixel 3) by more than runnear. Therefore, the 6 and 4 (pixels 7 and 8) are included in the run. Thus, the run is encoded as 6 pixels of value 5.

The advantages of the present invention have been demonstrated using the image of Appendix A. The image was compressed at 2.778 bits per symbol in the lossless mode (near=runnear=0), while it was compressed at 2.317 bits per symbol using near=0 (lossless) for regular contexts and runnear=5 (lossy) for the run context. In other words, a compression improvement of 16% was achieved with nearly no computational cost. The reconstructed image is visually lossless, and the error were introduced mainly in the background. In comparison, when near=runnear =5, as permitted by a standard JPEG-LS encoder, noticeable errors appear in the photographic part of the image.

Figure 6:
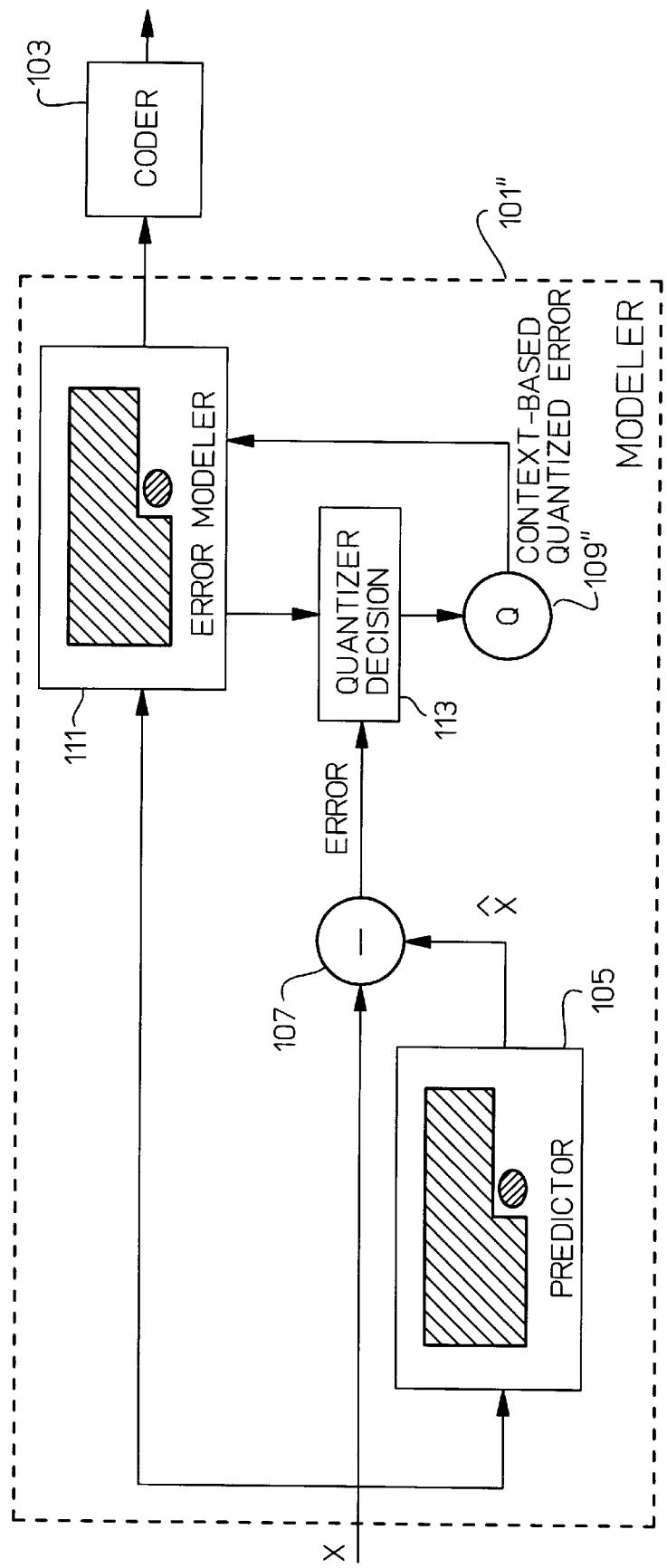
FIG. 6 is an encoding system according to a second embodiment of the invention.

FIG. 6 illustrates a further embodiment of the invention wherein some decision rules are used in the quantizing step. Different criteria are used to decide when to switch in and out of run mode.

The modeler 101" contains an error modeler 111 which supplies a quantizer decision module 113 with the context of the pixel being encoded. The quantizer decision module 113 uses the context to provide a value for near to the quantizer 109".

In a first alternative of the embodiment of FIG. 6, the encoder changes the value of near to runnear only after the run-length has reached a pre-specified length. The default (as described above) is that the pre-specified length equals to zero.

A second alternative of the embodiment of FIG. 6 deals with the encoding of images with multiple components (e.g., color images). According to this embodiment, the causal information from one color component can be used to determine the switch from near to runnear in another color component. For example, if the runs of all components are encoded together (e.g., as in the sample interleaved mode of JPEG-LS), and the run is interrupted in one component while it is not in the others, the switch from near to runnear is performed. Doing so prevents a run from stopping due to noise in a minority of the image components.

Figure 7:
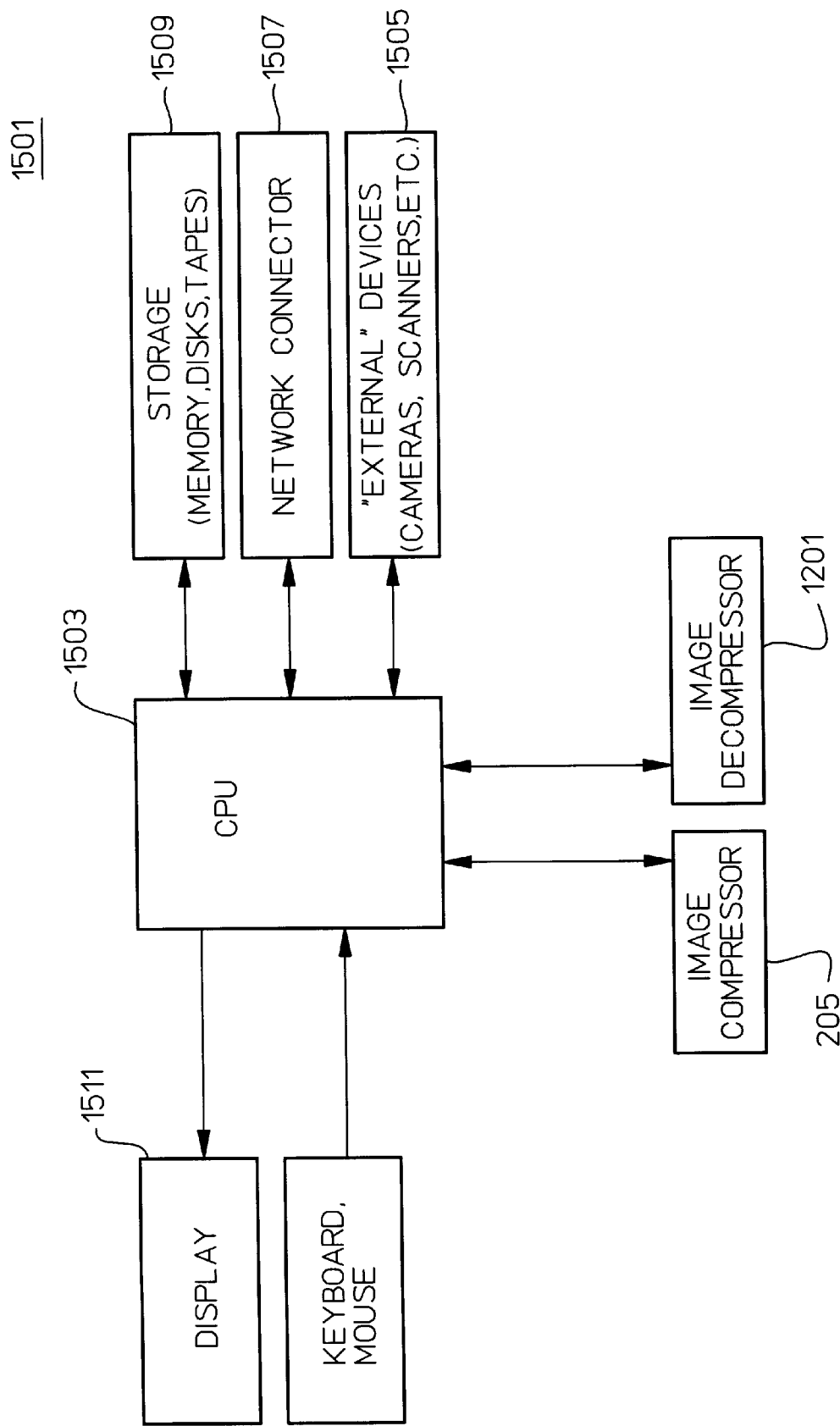
FIG. 7 is a block diagram of a computer system having an image compressor and an image decompressor according to the present invention.

FIG. 7 is a block diagram of a computer system 1501 incorporating the image compressor 205 and image decompressor 1201. The computer system 1501 has a central processing unit 1503 connected to one or more image sources 1505. The image sources 1505 may include devices such as digital cameras and scanners. The computer system 1501 may also be connected to computer networks, such as local area networks, the Internet, or online services, via network connections 1507 (e.g., via direct connections to networks or via modem). The CPU 1503 transmits images from the image sources 1505 to the image compressor 205 which compresses the image according to the method described above.

The CPU 1503 is further connected to storage devices 1509, e.g., memories (both for storage of images and other data), disk drives, and tape units. Subsequent to the compression of the images, the CPU 1503 may transmit images to these storage devices 1509. Alternatively, the CPU 1503 may direct the images to the network connections 1507.

The computer system 1501 may also decompress compressed images for display. The CPU may, for example, obtain a compressed image via the network connection 1507. The CPU 1503 directs such compressed images to the image decompressor 1201 which decompresses the image according to the method described above for image decompression. The CPU 1503 is further connected to a display 1511, e.g., a cathode-ray tube or flat-panel display. The CPU 1503 directs decompressed images for display on the display 1511.

In one embodiment, the image compressor 205 and the image decompressor 1201 is implemented as computer instructions operable to direct the operations of the CPU 1503. In such a case the image compressor 205 and image decompressor 1201 are stored in one of the storage devices 1509 and are executed by the CPU 1503 to compress and decompress images according to the methods of the present invention.

In an alternative embodiment the image processor 205 and image decompressor 1201 are special purpose hardware devices, e.g., image processing accelerators, attached to the CPU 1503 as auxilliary devices.

In certain applications, a computer system 1501 may need only be able to decompress images and not to compress images, and vice versa. In such cases either the compressor 205 or decompressor 1201 may be absent from the computer system 1501.

As a person skilled in the art will realize that numerous modifications and changes may be made to the present invention, it is not desired to limit the invention to the exact construction and operation as illustrated and described. Hence, all suitable modifications and equivalents may be resorted to as falling within the scope of the invention.

We claim:

1. In an image compression system having a context-based digital encoder operable to encode images for decoding by a context-based decoder an improvement comprising:
    encoding an image using at least two different thresholds, including at least
        a first threshold being applied to data that is a function of at least one pixel value to cause entry of the encoder into a mode in which individual pixel prediction errors are not separately encoded, and
        a second threshold, different from the first threshold, the second threshold being applied to data that is a function of at least one pixel value to cause the encoder to remain in a mode in which errors are not separately encoded,
    to thereby produce encoded compression data that may be used by the decoder to reconstruct the image.

2. An improvement according to claim 1, wherein:
    the second threshold is larger than the first threshold;
    the first threshold is applied to data representing at least one pixel gradient and causes the encoder to remain in a normal mode in which individual pixel prediction errors are separately encoded as long as the first threshold is exceeded;
    the second threshold is applied to data representing a differences between a current pixel value and a reference value to cause the encoder to detect a flat area and responsively remain in a run mode; and
    the encoder thereby detects relatively flat areas, encodes the relatively flat areas in a lossy manner, with a relatively larger threshold being used to cause the encoder to remain in the run mode for relatively flat areas.

3. An image compression system operable to encode images such that a decoder may decode the encoded images, comprising:
    a digital encoder that receives an image, processes individual pixels of the image to obtain compressed data, and outputs a digital signal representing the compressed data, the digital encoder having a run mode in which at least one pixel is encoded as being identical to a previous pixel;
    said digital encoder adapted to, enter the run mode in response to a comparison between a run mode trigger function value that is a function of at least one pixel with a first threshold value, near; and
    said digital encoder adapted to, while in the run mode, stay in the run mode in response to a comparison between a run mode stay function value that is a function of at least one pixel to be encoded with a second threshold value, runnear.

4. The image compression system of claim 3, wherein the run-mode trigger function is a function of previously encoded pixels in a template surrounding the pixel being encoded (x).

5. The image compression system of claim 4, wherein:
    the template contains a pixel above and to the left of x(c), a pixel above x(b), a pixel above and to the right of x(d), and a pixel to the left of x(a);
    wherein the run-mode trigger function is $|d-b|\&|b-c|\&|a-c|\leq$near; and
    wherein the run-mode stay function is $|a-x|\leq$runnear.

6. The image compression system of claim 5, wherein a, b, c, and d are reconstructed values.

7. An image compression system capable of encoding a digitized image such that a standard JPEG-LS decoder may decode an image encoded with the image compression system, comprising:
    a digital encoder having a regular mode, in which individual pixel prediction errors are separately encoded, and a run mode in which individual pixel prediction errors are not separately encoded;
    a first threshold value, near;
    a second threshold value, runnear;
    a run mode entry decision logic operable, in response to a comparison between a trigger value and near, to cause the encoder to transition into run mode; and
    a run mode stay decision logic operable, in response to a comparison between a stay value and runnear, to cause the encoder to remain in run mode.

8. The image compression system of claim 7 wherein near is less than runnear.

9. The image compression system of claim 7 wherein
    the run mode entry decision logic causes the image compression system to enter run mode when $$|d-b|\&|b-c|\&|a-c|\leq \text{near};$$

the run mode stay decision logic causes the image compression system to remain in run mode when $$|a-x|\leq \text{runnear}$$

where
        a is the value of the pixel to the left of the pixel being encoded, b is the value of the pixel above the pixel being encoded, c is the value of the pixel above and to the left of the pixel being encoded, d is the value of the pixel above and to the right of the pixel being encoded, and x is the value of the pixel being encoded.

10. The image compression system of claim 9 wherein a, b, c, and d are all reconstructed values.

11. The image compression system of claim 7, further comprising:
    a runnear adjustment logic for adaptively adjusting runnear.

12. The image compression system of claim 11 where the runnear adjustment logic sets runnear≠near when a run of a certain predetermined length has been encoded.

13. The image compression system of claim 10, when encoding multiple color planes, if a run is indicated in at least one color plane but not in one other color plane, adjusting runnear so that a run is encoded in both color planes.

14. The image compression system of claim 13, wherein the number of multiple color planes is at least three and the at least one color plane is at least two but less than the number of color planes.

15. The image compression system of claim 10, further comprising:
a look ahead unit, wherein if the look ahead unit indicates that a non-run pixel is located between two runs of equal value, the runnear adjustment logic sets runnear to a value whereby both runs and the non-run pixel are encoded as one run of the combined length of the two runs and the non-run pixel.

16. An improvement according to claim 1, further comprising at least three different thresholds including said first threshold, said second threshold, and a third, context-based threshold applied to data representing at least one pixel value to cause entry of the encoder into a mode in which pixel prediction errors are separately encoded when the third threshold is exceeded, said first threshold also being context-based and representing a different context than said third threshold.

17. An improvement according to claim 1, wherein:
applying the first threshold to data that is a function of at least one pixel includes applying the first threshold to at least one pixel gradient, each pixel gradient being a difference between a current pixel and a spatially-adjacent pixel; and
applying the second threshold to data that is a function of at least one pixel value includes applying the second threshold to a difference between a current pixel and a reference value.

18. An improvement according to claim 17, wherein applying the second threshold to a difference includes applying the second threshold to a difference between the current pixel and an immediately preceding pixel.

19. An image compression system operable to encode an image such that a decoder may decode the image, comprising:
a digital encoder that receives an image, processes individual pixels of the image to obtain compressed data, and outputs a digital signal representing the compressed data, the digital encoder having a run mode in which at least one pixel is encoded as being identical to a previous pixel and a regular mode in which pixel prediction errors are separately encoded; and
at least two thresholds, including a first threshold and a second threshold which are different in relative magnitude;
wherein the digital encoder includes
a first comparison function that causes entry into the run mode from the regular mode dependent upon comparison between the first threshold and a value that is a function of at least one pixel, and
a second comparison function that causes entry into the regular mode from the run mode dependent upon comparison between the second threshold and a value that is a function of at least one pixel.

20. An image compression system according to claim 19, wherein the first threshold is compared with a value that is a function of at least three pixels and that indicates occurrence of a relatively flat image area, and wherein the second threshold is larger than the first threshold and influences the system to be relatively insensitive to pixel variation in a relatively flat image area.

* * * * *